(12) United States Patent
Takahashi et al.

(10) Patent No.: US 7,806,222 B2
(45) Date of Patent: Oct. 5, 2010

(54) COLLISION DETECTOR

(75) Inventors: Hisashi Takahashi, Kariya (JP); Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 650 days.

(21) Appl. No.: 11/728,635

(22) Filed: Mar. 27, 2007

(65) Prior Publication Data
US 2007/0227797 A1    Oct. 4, 2007

(30) Foreign Application Priority Data
Mar. 29, 2006  (JP) .............................. 2006-091824
Oct. 11, 2006  (JP) .............................. 2006-277502

(51) Int. Cl.
*B60K 28/14* (2006.01)
(52) U.S. Cl. ...................... 180/274; 340/436
(58) Field of Classification Search ................ 180/274, 180/282; 340/436
See application file for complete search history.

(56) References Cited

U.S. PATENT DOCUMENTS

| | | | | |
|---|---|---|---|---|
| 3,654,412 A * | 4/1972 | Haruna et al. | ............. | 200/83 Z |
| 3,853,199 A * | 12/1974 | Hirashima et al. | ........... | 180/274 |
| 4,215,878 A * | 8/1980 | Hirbod | ........................ | 280/737 |
| 6,561,301 B1 * | 5/2003 | Hattori et al. | ................ | 180/274 |
| 7,116,215 B2 * | 10/2006 | Oonishi | ....................... | 340/436 |
| 7,429,916 B2 * | 9/2008 | Kiribayashi | ................. | 340/436 |
| 7,556,116 B2 * | 7/2009 | Ootani et al. | ................ | 180/274 |
| 7,584,988 B2 * | 9/2009 | Okamoto et al. | ......... | 280/730.1 |
| 7,635,042 B2 * | 12/2009 | Mader | ........................ | 180/274 |
| 2005/0104721 A1 | 5/2005 | Mae et al. | | |
| 2005/0116817 A1 | 6/2005 | Mattes et al. | | |
| 2005/0269805 A1 * | 12/2005 | Kalliske et al. | .......... | 280/730.1 |
| 2006/0087417 A1 | 4/2006 | Kiribayashi | | |
| 2006/0102413 A1 * | 5/2006 | Ootani et al. | ................ | 180/274 |
| 2006/0191731 A1 * | 8/2006 | Hashimoto et al. | .......... | 180/274 |
| 2006/0237255 A1 * | 10/2006 | Wanami et al. | ............. | 180/274 |
| 2007/0227797 A1 * | 10/2007 | Takahashi et al. | ........... | 180/274 |
| 2009/0021359 A1 * | 1/2009 | Tanabe | ........................ | 340/436 |

FOREIGN PATENT DOCUMENTS

| | | | |
|---|---|---|---|
| DE | 74 16 038 | | 12/1974 |
| DE | 196 02 990 | | 8/1996 |
| DE | 10 2004 022 591 | | 11/2005 |
| JP | 02-249740 | * | 5/1990 |
| JP | 2000-131157 | | 5/2000 |

OTHER PUBLICATIONS

Office Action dated Mar. 3, 2008 in German Application No. 10 2007 013 754.2 with English translation thereof.

* cited by examiner

*Primary Examiner*—Toan C To
*Assistant Examiner*—Karen Jane J Amores
(74) *Attorney, Agent, or Firm*—Harness, Dickey & Pierce, PLC

(57) ABSTRACT

A collision detector for a vehicle that defines a width direction is disclosed. The collision detector includes a back plate for coupling to the vehicle. The collision detector also includes a plurality of chamber members coupled to the back plate. Each of the chamber members defines a chamber space therein. Also, the collision detector includes a pressure sensor for detecting pressure in at least one of the chamber spaces to thereby detect collision of the vehicle. The chamber members are provided across the width of the vehicle.

14 Claims, 12 Drawing Sheets

COLLISION DETECTOR

CROSS REFERENCE TO RELATED APPLICATIONS

The following is based upon and claims priority to Japanese Patent Application No. 2006-91824, filed Mar. 29, 2006, and Japanese Patent Application No. 2006-277502, filed Oct. 11, 2006, each of which is incorporated by reference in their entirety.

TECHNICAL FIELD

The present invention relates to a collision detector for a vehicle that detects collision of the vehicle and, in particular, to a collision detector with a plurality of chamber members with at least one pressure sensor for detecting pressure in at least one of the chamber members.

BACKGROUND INFORMATION

Several vehicle safety systems have been proposed that provide passenger safety in the event of a vehicular collision. Some vehicle safety systems also provide pedestrian safety in the event that a vehicle and a pedestrian impact each other.

For instance, some systems have been proposed that reduce the degree of pedestrian injury that impacts a vehicle hood during collision with a vehicle. Several of these systems decrease the force with which the pedestrian impacts the hood to thereby reduce the degree of injury. Also, several of these systems employ some sort of detection system that detects collision with a pedestrian and the like.

For example, JP-2005-538881A (PCT international publication) discloses such a system. Specifically, JP-2005-538881A discloses a system with a vehicle front contact sensor with at least one cavity. A sensing element is disposed in the cavity to detect a collision based on deformation of the cavity.

Also, JP-2005-538881A discloses a technology of incorporating another sensor which can detect a pedestrian collision. In other words, the vehicle front contact sensor disclosed in JP-2005-538881A is not intended for detecting collision with a pedestrian.

FIG. 21 illustrates a bumper corresponding to the device and detecting method disclosed in JP-2005-538881A. As shown, the bumper includes a chamber member 2 with an air-tight chamber space defined therein, and which corresponds to the cavity in JP-2005-538881A. The chamber member 2 is included between a bumper reinforcement 1, which is fixed to side members Fm, and a bumper cover 4, which forms an outer-peripheral face of the bumper of the vehicle. Collision is detected by a pressure fluctuation in the space.

As shown, the front surface of the chamber member 2 and the bumper cover 4 is curved at each end. As such, the thickness of the chamber member in the forward and aft directions of the vehicle changes across the width of the chamber member 2. Thus, a deforming amount of the chamber member 2 can vary for the same collision conditions depending on the collision location as shown by comparing FIGS. 22 and 23. More specifically, because the thickness of the chamber member is relatively large near the middle of the bumper, a collision at the middle of the bumper is able to crush in a relatively large distance S1. In comparison, the same collision condition at the end of the bumper is only able to crush in a relatively small distance S2. Thus, the change of volume within the chamber space due to the collision also varies depending on the location of the collision. Therefore, the pressure-change detected by the collision detector likewise varies, which detrimentally affects the accuracy of the collision detector.

Furthermore, the collision detector described above may detect a collision, but the collision detector is unlikely to be able to distinguish between the objects with which the vehicle impacts. Accordingly, the collision detector is unlikely to be able to detect whether the vehicle has impacted a human body or not.

In view of the above, there exists a need for a collision detector which overcomes the above mentioned problems in the conventional art. The present disclosure addresses this need in the conventional art as well as other needs, which will become apparent to those skilled in the art.

SUMMARY

A collision detector for a vehicle that defines a width direction is disclosed. The collision detector includes a back plate for coupling to the vehicle. The collision detector also includes a plurality of chamber members coupled to the back plate. Each of the chamber members defines a chamber space therein. Furthermore, the collision detector includes a pressure sensor for detecting pressure in at least one of the chamber spaces to thereby detect collision of the vehicle. The chamber members are provided across the width of the vehicle.

BRIEF DESCRIPTION OF THE DRAWINGS

Other objects, features, and advantages of the present disclosure will become more apparent from the following detailed description made with reference to the accompanying drawings, in which like parts are designated by like reference numbers and in which.

DETAILED DESCRIPTION OF THE EXAMPLE EMBODIMENTS

Figure 1:
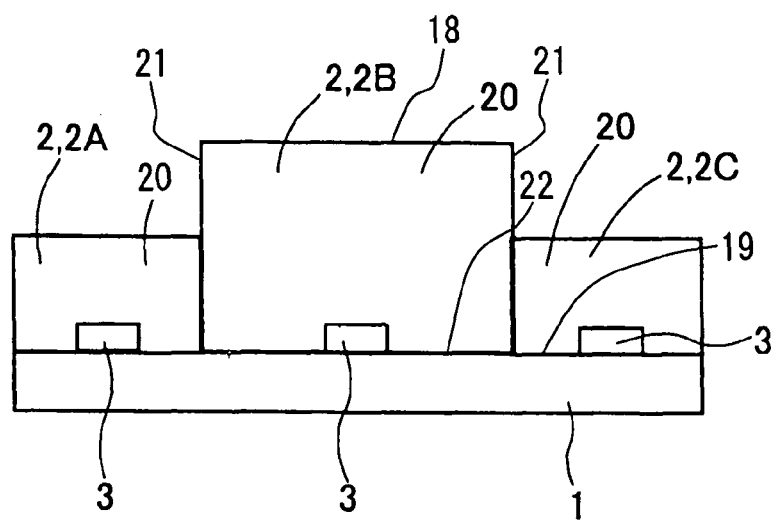
FIG. 1 is a partial top view of a collision detector in a first embodiment of the present disclosure.

A collision detector in one embodiment includes a back plate which is fixed to side members of a vehicle, a chamber member which defines an air-tight chamber space which is disposed in front of the back plate, and a pressure sensor which detects pressure in the chamber space. The collision detector detects collision from a pressure change in the chamber space. In other words, the collision detector is built in a bumper which is structured by the side members of the vehicle, and detects a collision of a pedestrian and the like with the bumper of the vehicle.

The collision detector includes a plurality of the chamber members in each of which the pressure sensor is provided are disposed in a line in the width direction of the vehicle. In other words, the collision detector includes a plurality of the chamber members which measure pressures in the chamber spaces respectively, and the pressure determination is made based upon the determination condition corresponding to each chamber member. Therefore, the collision detector can detect the collision with a high accuracy even with the difference in size between each chamber space. The collision detector detects a collision according to a pressure change in the chamber space of the chamber member located in a position corresponding to a portion with which a colliding object collides, out of a plurality of the chamber members. Thus, collision characteristics can be accurately detected.

Since the back plate is fixed to the side members of the vehicle, the collision detector is built in the bumper of the vehicle and detects the collision with the bumper of the vehicle. The back plate may be fixed to a bumper reinforcement which is fixed to the side members and a crush box. However, it is preferable to fix the back plate directly to the side members of the vehicle. In fact, it is further preferable to structure the back plate to be made of the bumper reinforcement. By also structuring the back plate as the bumper reinforcement, part costs can be reduced.

The chamber member defines the air-tight chamber space. The chamber member is disposed in front of the back plate. By disposing the chamber member in front of the back plate, the chamber member can be built in the bumper of the vehicle and the collision with the bumper of the vehicle can be detected.

In the collision detector, when the colliding object collides with the vehicle, the colliding object presses the chamber member adjacent the collision region, which changes (raises) pressure in the chamber space. The pressure sensor measures a pressure fluctuation in the chamber space at the time of the collision, detecting the collision from the measurement result of the pressure sensor.

The collision detector of the present invention may be built in the bumper of the vehicle. Generally, the bumper of the vehicle forms an outer-peripheral face of the vehicle. In other words, it is preferable for the collision detector to include a bumper cover which forms the outer-peripheral face of the vehicle.

When the collision detector includes the bumper cover, the bumper cover may be located in front of the chamber member. As for the surface in front of the chamber member and the bumper cover, it is permitted to allow gaps therebetween or to allow contact therebetween. When the chamber member and the bumper cover are separated by a gap, a filling member can be provided in the gap.

As for a plurality of the chamber members, the chamber members can abut each other. As such, deformation of one chamber member can more directly cause deformation of adjacent chamber members for increased detection accuracy. In one embodiment, entire neighboring faces abut each other, but in another embodiment, only portions of the neighboring faces abut each other.

In the collision detector, when the chamber member is deformed due to the collision, it is preferable for a wall which forms the chamber member not to restrict the deformation of the chamber member. More specifically, when the wall which forms the chamber member (a side face wall which defines the chamber space of the chamber member) is disposed parallel to a stress applied to the chamber member at the time of the collision, it is possible for the rigidity of the wall to restrict the deformation of the chamber member. If the deformation of the chamber is restricted, a variation amount of pressure in the chamber space can be relatively small, possibly degrading detection accuracy of the collision detector. However, without such a restriction on the deformation of the chamber member, detection accuracy is less likely to be degraded. For instance, a portion where the side face walls of the neighboring chamber members are located includes two side face walls facing each other, and such an arrangement can limit deformation and degrade the detection accuracy. Therefore, it is particularly preferable to provide a structure which does not restrict the deformation in the portion where the side face walls of the neighboring chamber members are located.

As for the chamber member, it is preferable for the side face wall facing the neighboring chamber member to be more flexible than another side face wall. In the above arrangement, when the colliding object collides to press the chamber member, a pressing force is not to be used for the deformation of the side face wall facing the neighboring chamber member, but a stress from the colliding object is to be used only for the deformation of the chamber member. In other words, loss of energy of the collision of the colliding object is less likely. More specifically, in a case when the side face wall facing the neighboring chamber member is formed of a hard material, the side face wall thereof is to restrict the deformation of the chamber member, which causes a loss of the applied stress. In addition, when the side face wall thereof is formed of a hard material, a variation amount of the deformation of the chamber member is reduced, and the pressure in the chamber space is also reduced, possibly deteriorating the detection accuracy of the collision.

As for the chamber member, it is preferable for at least one part of the side face wall facing the neighboring chamber member to include an inclined part which is slanted to a surface of the back plate. In the above arrangement, the way the chamber member is deformed when a colliding object collides (for example, the way the side face wall facing the neighboring chamber member is crushed) become constant, which maintains a more constant output energy in the measurement result which occurs when the deformation is produced in various ways. In other words, it is possible to maintain accurate collision detection.

As at least one part of the side face wall of the neighboring chamber member, which faces the neighboring chamber member, is inclined, it is possible to direct the deformation of the side face wall occurring at the time of the collision to a certain direction to thereby control the deformation behavior of the chamber member. It is preferable that at least one part of the side face wall is slanted, and it is more preferable that the whole face of the side face wall is slanted.

A slanting face which forms one part of the side face wall of the chamber member may be a planar face or a curved face. The slanting face may also be a combination of the planar face and the curved face.

It is preferable for the surface of the chamber member which is at the opposite side of the back plate to be formed in a shape bent along the outer-peripheral face of the vehicle. In the above arrangement, the chamber member is to include a surface which approximately conforms to the bumper cover (a surface along the bumper cover), and the chamber member thereof can restrict the deformation of the bumper cover when there is no colliding object.

When the surface of the chamber member at the opposite side of the back plate is formed along the outer-peripheral face of the vehicle, it is permitted for the opposing faces of the chamber member and the back plate to be disposed by an interval, or to contact with each other. When a gap exists between the chamber member and the back plate, for restricting the deformation of the bumper cover when there is no colliding object, a filling member can be provided therein.

The chamber member is preferred to include in at least one part of an upper face wall and a lower face wall with a slanting-wall part extending in a direction intersecting a horizontal plane of the vehicle. By disposing the slanting-wall part in at least one of the upper face wall and the lower face wall, the deformation of the chamber member is less restricted when the collision occurs, and it is possible to increase detection accuracy of the collision. Here, the upper face wall is a part of a wall (a side face wall) which forms the chamber member, and also the upper face wall is the wall (the side face wall) which is disposed in an upper face side of upward and downward directions of the vehicle. The lower face wall is a wall (a side face wall) which is at the opposite side of the upper face wall. Generally, the upper face wall and the lower face wall are disposed in such a state to extend out in the horizontal direction. When the colliding object collides with the bumper of the vehicle, the chamber member is pressed to the forward and backward directions of the vehicle (the horizontal direction). If the upper face wall and the lower face wall are formed in a flat plate shape as to extend out in the direction where the chamber member is deformed (formed in such a shape not to include the slanting-wall part), the rigidities of the upper face wall and the lower face wall may restrict the deformation. On the other hand, if the upper face wall and the lower face wall are formed to include the slanting-wall part, when the stress in the forward and backward directions of the vehicle is applied to the chamber member, it is possible to reduce rigidities of the upper face wall and the lower face wall from negating the stress. In other words, the deformation of the chamber member due to the applied stress is less restricted. As a result, the possibility of the deterioration of the detection accuracy is less likely.

The slanting-wall part is preferred to be formed over the whole face of at least one of the upper face wall and the lower face wall. By forming the slanting-wall face on the whole face of at least one of the upper face wall and the lower face wall, the deformation of the chamber member by the applied stress is less restricted.

A slanting configuration of the slanting-wall part is not limited in particular as long as the slanting-wall part is formed to extend out in the direction intersecting the horizontal direction. Thus, it is permitted to adopt any configuration of a flat face, a curved face, or a combination of the flat face and the curved face. The slanting-wall face is preferred to be formed to include a flat face.

When the slanting-wall part includes a curved face, the slanting-wall part is permitted to be a convexly-bent shape to the chamber space, a concavely-bent shape, or a combined configuration of convexly and concavely-bent shapes. The slanting-wall part is preferred to be formed to include at least one of convexity and concavity to the chamber space.

The slanting-wall part is preferred to be formed in a wave shape which extends out in the forward and backward directions of the vehicle. The wave shape which forms the slanting-wall part may be in a shape which includes a plurality of repeated convexity and concavity to the forward and backward directions of the vehicle. The wave shape is permitted to be a shape which includes a plurality of repeated convexity and concavity (a bellows shape) formed by planar faces or by curved faces. In a case the slanting-wall part is formed in a wave shape, when the stress is applied to the chamber member, the chamber member gets compressed in such a manner that a wave cycle of the wave shape (a length in the forward and backward directions of the vehicle) is shortened. Thus, the wave shape (the bellows shape) helps deform the chamber member easily, and as the slanting-wall part is formed in the wave shape, restriction on the deformation of the chamber member is less likely. As a result, degradation of the detection accuracy is less likely.

The collision detector achieves the effect in detecting the collision of the colliding object with the bumper of the vehicle in which the collision detector is built. However, it is preferable to detect the collision of a pedestrian with the bumper of the vehicle.

The collision detector is preferred to include a computing device which finds pressure fluctuations in the chamber space from a detection signal to determine the collision. By including the computing device, the collision determination can determine not only the collision, but also the colliding object based upon the pressure fluctuations occurring when the collision occurs. When the collision detector determines that the colliding object is a pedestrian, the collision detector can send an operating signal to a pedestrian protector which is provided on the vehicle.

Several embodiments are hereinafter discussed.

First Embodiment

Referring initially to FIG. 1, a collision detector for a vehicle is shown. The collision detector includes a back plate, such as a bumper reinforcement 1 of the vehicle. The collision detector also includes a plurality of chamber members 2A, 2B, 2C, and each defines a chamber space 20 therein. In one embodiment, the chamber space 20 is air-tight. Furthermore, the collision detector includes a plurality of pressure sensors 3. The pressure sensors 3 are operatively provided within respective ones of the chamber spaces 20. The pressure sensors 3 detect pressure in the corresponding chamber space 20. When pressure changes in the chamber space 20 (e.g., due to deformation of the chamber space 20 during vehicle collision), the corresponding pressure sensor 3 detects the pressure change therein. The pressure sensor 3 is in communication with a computing device (i.e., computing means) (not shown) such as the vehicle ECU. The pressure change signals from the pressure sensors 3 are received by the computing device in order to gather data regarding the vehicle collision.

Figure 2:
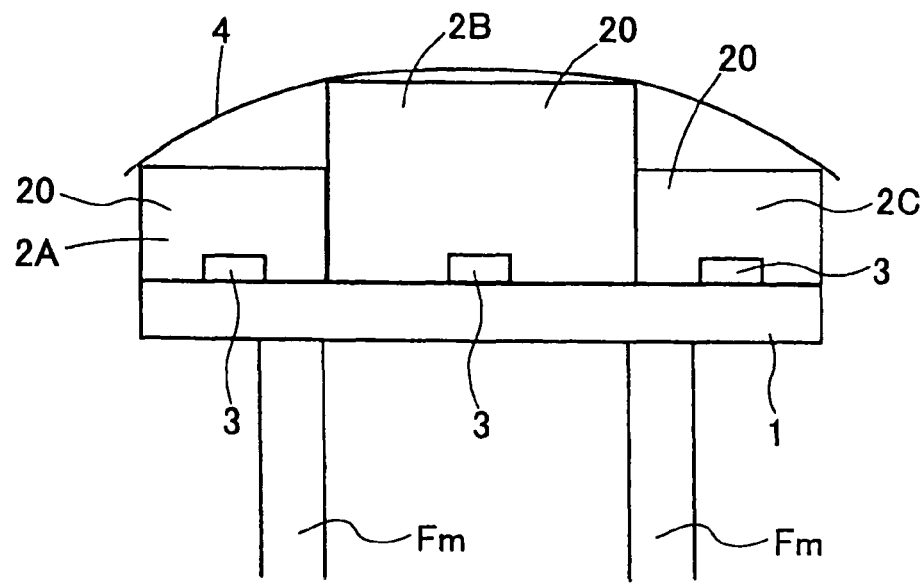
FIG. 2 is a top view of the collision detector of FIG. 1 coupled to a vehicle.

The bumper reinforcement 1 is a metal plate having a substantially band-like shape. The bumper reinforcement 1 has a coupling surface 19 that faces the front part of the vehicle. As shown in FIG. 2, the bumper reinforcement 1 is fixed to a pair of vehicle front side members Fm. The front side members Fm extend out in front of an engine compartment of the vehicle. The bumper reinforcement 1 is fixed to axially extend across a width of the vehicle.

Furthermore, the chamber members 2 are substantially box-shaped with orthogonal sides. More specifically, the chamber members 2 include two side face walls 21 that are opposite each other and spaced away from each other. The side face walls 21 extend substantially vertical relative to the vehicle. The chamber members 2 also include a front face wall 18 that extends substantially vertically between the two side face walls 21 on front ends thereof. The chamber members 2 further include a back face wall 22 that is opposite the front face wall 18 and that extends substantially vertically between the two side face walls 21 on back ends thereof. Moreover, there are end face walls (i.e., top and bottom face walls) (not shown) that cover the top and bottom of the chamber member 2 for providing an air-tight seal of the chamber space 20 therein.

The back face walls 22 of the chamber members 2 are coupled to a coupling surface 19 of the bumper reinforcement 1 such that the chamber members 2 are aligned across the width of the vehicle. As such, two of the chamber members 2A, 2C are positioned on outboard ends of the vehicle, and one of the chamber members 2B is positioned therebetween. In the embodiment shown, the two outboard chamber members 2A, 2C have approximately the same size, and the middle chamber member 2B is larger than the outboard chamber members 2A, 2C. The front faces 18 of the two outboard chamber members 2A, 2C are co-planar across the width of the vehicle. Furthermore, the front face wall 18 of the middle chamber member 2B is provided further to the front of the vehicle than the front face walls 18 of the outboard chamber members 2A, 2C.

The deformation properties of the chamber members 2 (i.e., the force, pressure, etc. necessary for deforming the chamber members 2) varies between chamber members 2. For instance, in this embodiment, more force, pressure, etc. is needed to deform the middle chamber member 2B as compared to the outboard chamber members 2A, 2C. Also, in one embodiment, the pressure sensors 3 vary between the chamber members 2. For instance, in one embodiment, if an amount of pressure change in one of the outboard chamber members 2A, 2C is indicative of a certain vehicle collision, the same amount of pressure change in the middle chamber member 2B would be indicative of a different type of vehicle collision. As such, collisions can be detected more accurately.

Furthermore, as shown in FIG. 2, the collision detector includes a bumper cover 4 that covers the chamber members 2, and forms an outer-peripheral face of the bumper of the vehicle. The bumper cover 4 is curved for aerodynamic and aesthetic reasons.

As shown in FIG. 2, at least a portion of the front wall face 18 of the chamber members 2 contacts the inner surface of the bumper cover 4. In other words, the size (especially the length) of the chamber members 2 are determined to thereby minimize gaps between the chamber member 2 and the bumper cover 4 (i.e., a gap between the front wall face 18 of the chamber member 2 and the bumper cover 4). In the collision detector in the first embodiment, the bumper cover 4 is supported by the chamber member 2 at the points of contact therebetween. Due to the support, when there is no colliding object (i.e. an object that the vehicle collides with), there is little deformation of the bumper cover 4, and the aesthetic quality of the bumper can be maintained.

When the vehicle collides with a colliding object, the colliding object presses on and deforms the bumper of the vehicle. The colliding object presses an absorber through the bumper cover 4 of the bumper of the vehicle. The absorber is formed to be harder than the chamber member 2, and therefore, the chamber member 2 is deformed before the absorber is deformed (absorbing the stress).

According to the deformation of the chamber member 2, pressure in the chamber space 20 increases, the pressure sensor 3 measures the pressure change, and the computing device receives data regarding the pressure change. The computing device determines that the colliding object has collided with the vehicle according to the pressure change (increase). The computing device also determines whether the colliding object is a human body (pedestrian, etc.) or a harder structure such as another vehicle, from a degree of the pressure change (a changing rate). In one embodiment, speed data is also input to the computing device for collision characteristic analysis.

For example, it is assumed that the colliding object collides with a central part of the bumper of the vehicle. When the colliding object collides, the colliding object presses the bumper cover 4 in the direction of the bumper reinforcement 1, and the collided portion is deformed (compressed). The compression deforms the middle chamber member 2B, while the outboard chamber members 2A, 2C are relatively unaffected. In other words, when the colliding object collides with the central part of the bumper, the collision detector determines the collision based upon the pressure change in the middle chamber member 2B.

In one embodiment, when the colliding object collides with the central part, the collision determination is made not only from the pressure change in the middle chamber member 2B, but also may be made from the pressure change in the outboard chamber members 2A, 2C.

For example, it is assumed that a colliding object collides with the left outboard end of the bumper of the vehicle. When the colliding object collides, the colliding object presses the bumper cover 4 in the direction of the bumper reinforcement 1, and the bumper cover 4 is deformed (compressed) from the collided portion. The deformation of the bumper cover 4 deforms the outboard chamber member 2A adjacent the area of collision and also deforms the middle chamber member 2B. The outboard chamber member 2C opposite the area of collision is relatively unaffected. The collision detector determines the collision from the pressure change in the outboard chamber member 2A.

When the colliding object collides with an outboard end of the bumper, the collision determination is made not only from the outboard chamber member 2A, but also may be made from the pressure change in the middle chamber member 2B which is disposed in the central part and the chamber member 2C which is disposed at the opposite outboard end.

In one embodiment, the collision detector finds a correction output from the pressure changes of all the three chamber members 2 to determine the collision and the colliding object from the correction output.

The collision detector in the first embodiment is configured so that the middle chamber member 2B and the outboard chamber members 2A, 2C have different deformation properties (i.e., different amounts of force, pressure are needed for deforming the chamber members 2A, 2B, 2C). Therefore, even when a deformation amount of either outboard chamber members 2A, 2C is smaller than that of the middle chamber member 2B, it is possible to use the pressure change in each chamber space 20 for determining the collision.

As shown above, the collision detector in the first embodiment achieves the effect of detecting the collision and determining the colliding object with high detection accuracy when the colliding object collides. In other words, the collision detector in the first embodiment provides excellent high detection accuracy.

Second Embodiment

Figure 3:
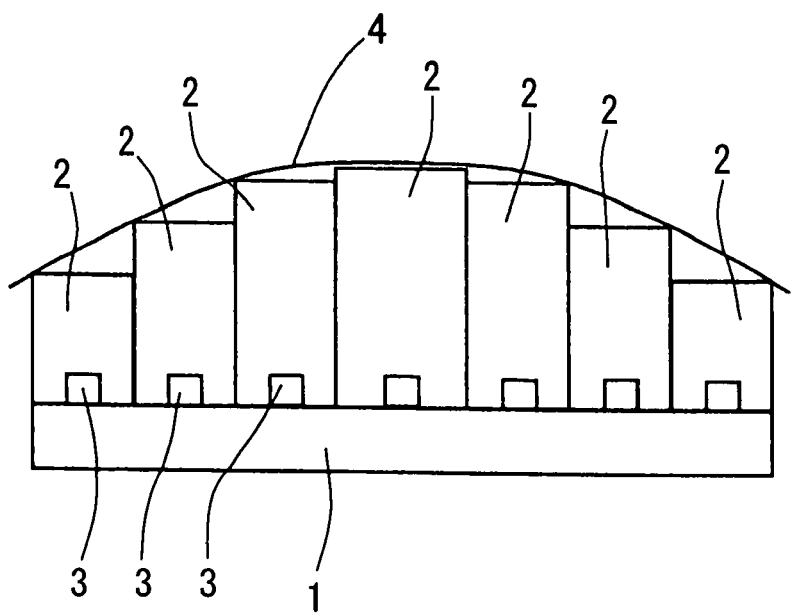
FIG. 3 is a top view of a second embodiment of the collision detector.

A second embodiment is a collision detector similar to the first embodiment except that the number of chamber members 2 is different. FIG. 3 shows a structure of a collision detector in the second embodiment.

The collision detector in the second embodiment, the same as the first embodiment, can detect and determine collision from a pressure change in a chamber space 20 of each chamber member 2, and achieves the same effect as the first embodiment.

In the second embodiment, as shown in FIG. 2, the number of the chamber members 2 is greater than in the first embodiment. Specifically, in the embodiment shown, there are seven chamber members 2. Therefore, a gap between a front face of each chamber member and a bumper cover 4 is reduced, and a gap between the collision detector (a front face of the chamber member 2) and the bumper cover 4 is also reduced. In a case the gap between the collision detector (the front face of the chamber member 2) and the bumper cover 4 is reduced, when the colliding object collides with a bumper of a vehicle to deform the bumper cover 4, the bumper cover 4 more directly contacts the front face wall 18 of the chamber member 2, which means that the colliding object deforms the chamber member 2 more immediately. In other words, the collision energy which is necessary to deform the bumper cover 4 does not contribute to the deformation of the chamber member 2 until the bumper cover 4 contacts the front face of the chamber member 2. Thus, a larger gap can reduce the detection accuracy of the collision detector. As such, the reduced gap of the second embodiment causes the effect of increasing the detection accuracy.

Third Embodiment

Figure 4:
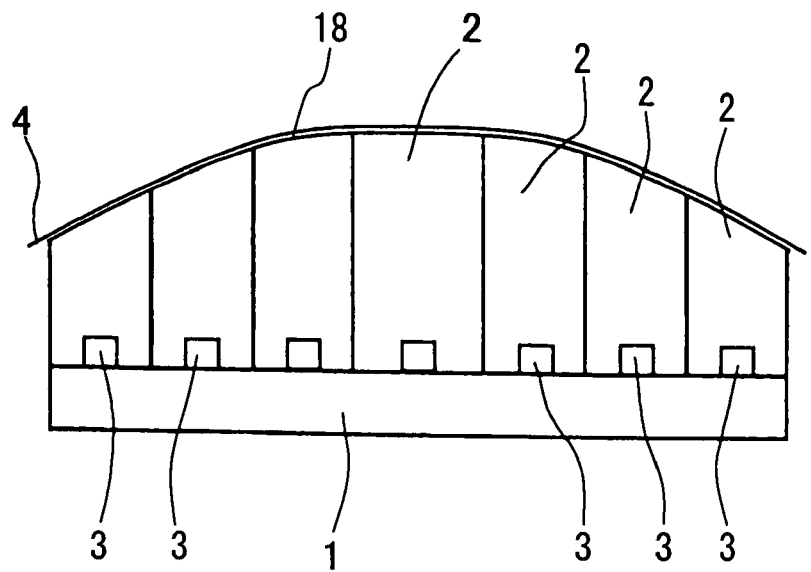
FIG. 4 is a top view of a third embodiment of the collision detector.

The third embodiment is a collision detector similar to the second embodiment except that the front face wall 18 of the chamber members 2 are non-planar. As such, the front face walls 18 of each chamber member 2 conform to the shape of the inner surface of the cover 4. As such, there is little, if any gap between the chamber members 2 and cover 4 for increased detection accuracy. FIG. 4 shows a structure of the collision detector in the third embodiment.

The collision detector in the third embodiment, the same as the first embodiment, can detect and determine the collision from a pressure change in a chamber space 20 of each chamber member 2, and achieves the same effect as the first embodiment.

Due to the reduced gap between the chamber members 2 and the cover 4, deformation of the cover 4 is more likely to directly cause deformation of the chamber members 2 for increased accuracy.

Fourth Embodiment

Figure 5:
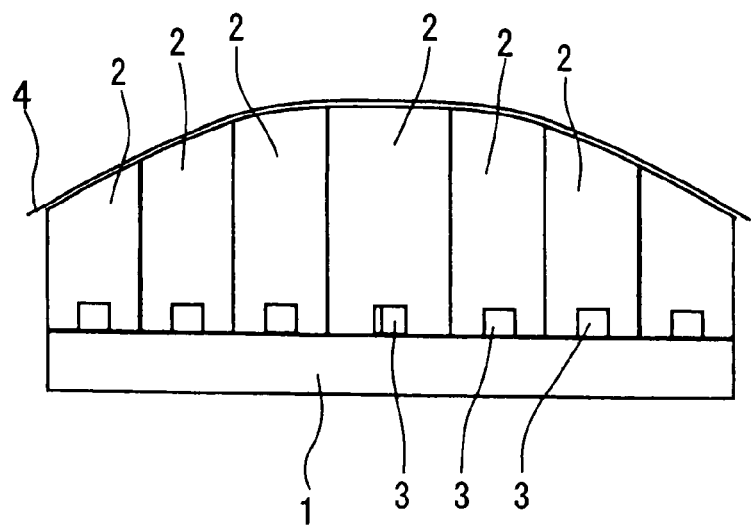
FIG. 5 is a top view of a fourth embodiment of the collision detector.
Figure 6:
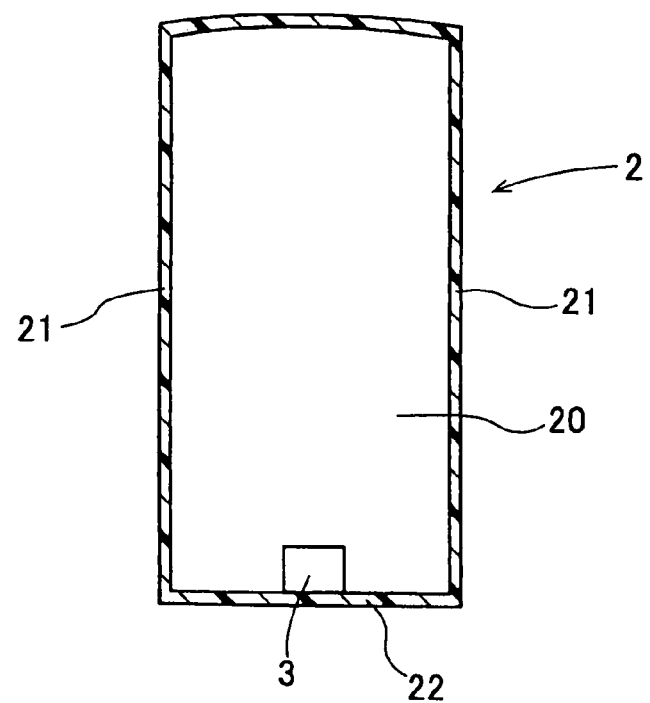
FIG. 6 is a top section view of the collision detector of FIG. 5.

The fourth embodiment is a collision detector similar to the third embodiment except that the side face walls 21 of the chamber members 2 are more flexible than the rear face wall 22. FIGS. 5 and 6 show a structure of a collision detector in the fourth embodiment. In addition, FIG. 5 shows a structure of the collision detector in the fourth embodiment, and FIG. 6 shows a cross section of a chamber member.

The collision detector in the fourth embodiment, the same as the third embodiment, can detect and determine the collision from a pressure change in a chamber space 20 of each chamber member 2, and achieves the same effect as the third embodiment.

In addition, in the collision detector in the fourth embodiment, the side face wall 21 is formed to be more flexible than the rear face wall 22, and therefore, the side face wall 21 does not restrict the deformation of the chamber member 2 when a colliding object collides with a bumper. More specifically, the side face wall 21 is formed to extend out in the forward and backward directions of a vehicle which is the direction primarily in which the colliding object collides. In one embodiment, the side face walls 21 are made out of a more flexible material than that of the rear face wall 22.

Also, in one embodiment, the side face wall 21 includes one or more ribs to reduce the likelihood of deformation in a certain direction and to make deformation in another direction more likely. For instance, in one embodiment, the side face walls 21 include one or more ribs that make deformation in the forward and backward direction of the vehicle more likely. Thus, by forming the side face wall 21 to be more flexible and/or adding ribbing, deformation behavior of the chamber member 2 can be controlled.

Fifth Embodiment

Figure 7:
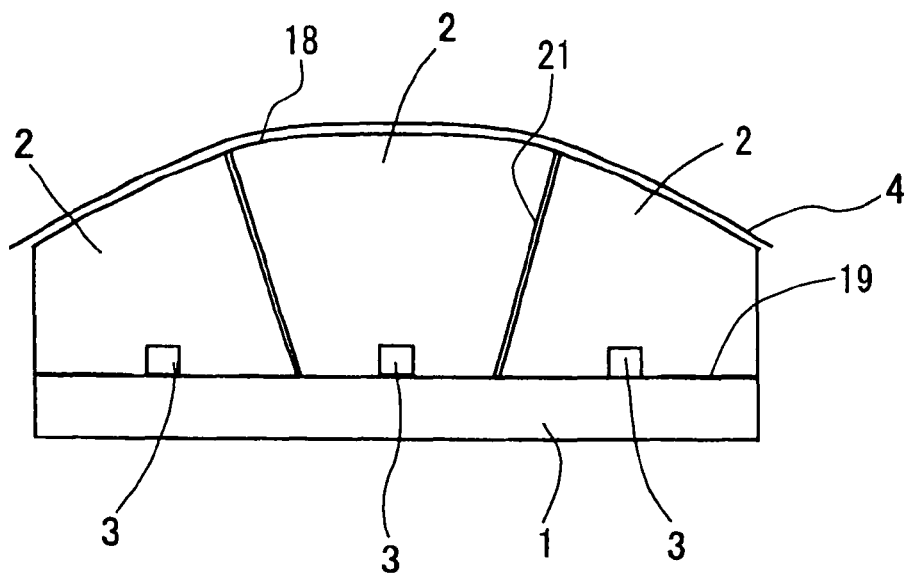
FIG. 7 is a top view of a fifth embodiment of the collision detector.

The fifth embodiment includes three chamber members 2, and the side face walls 21 thereof are at least partially inclined relative to the coupling surface 19 of the bumper reinforcement 1. In the embodiment shown, the side face walls 21 that face neighboring chamber members 2 are planar and inclined relative to the coupling surface 19. In addition, the front face walls are contoured according to the inner surface of the bumper cover 4 to reduce gaps therebetween. FIG. 7 shows a structure of the collision detector in the fifth embodiment.

The collision detector in the fifth embodiment, similar to the first embodiment, can detect and determine the collision from a pressure change in a chamber space 20 of each chamber member 2, and achieves the same effect as the first embodiment.

In addition, in the collision detector in the fifth embodiment, the side face walls 21 are inclined relative to the coupling surface 19 of the bumper reinforcement 1. Therefore, the deformation of the chamber member 2 can be controlled, and variation of the measurement thereof is less likely. As such, detection accuracy is increased.

Sixth Embodiment

Figure 8:
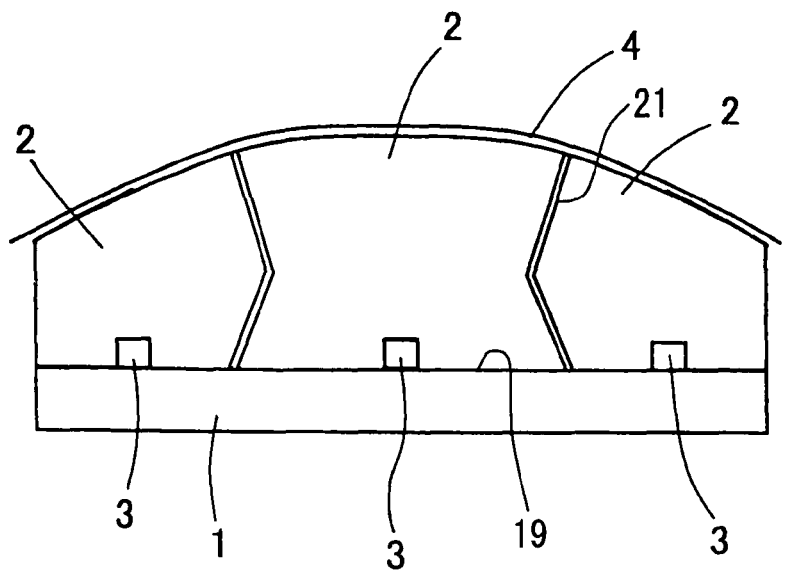
FIG. 8 is a top view of a sixth embodiment of the collision detector.
Figure 9:
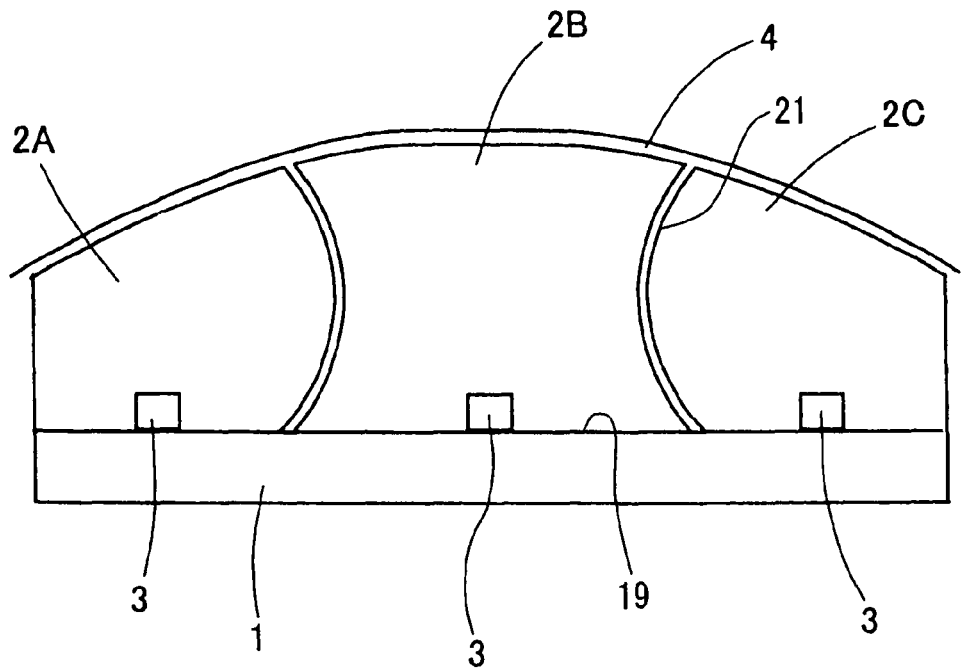
FIG. 9 is a top view of a seventh embodiment of the collision detector.

The sixth embodiment is the same as a collision detector in the fifth embodiment the side face walls 21 are inclined differently relative to the coupling surface 19. FIG. 8 shows a structure of a collision detector in the sixth embodiment.

In the embodiment shown, the side face walls 21 include a plurality of portions that incline in different directions. As such, the side face walls 21 are V-shaped. As such, the collision detector achieves the same effect as the fifth embodiment.

Seventh Embodiment

The seventh embodiment is the same as a collision detector in the sixth embodiment except the side face walls 21 are inclined differently relative to the coupling surface 19.

In the embodiment shown, the side face walls 21 are curved such that the angle of inclination (tangential to each curved side face wall 21) changes across the length thereof. More specifically, the outboard chamber members 2A, 2C have inner side face walls 21 that are curved outwardly toward the center axis of the vehicle. Also, both side face walls 21 of the middle chamber member 2B are curved inwardly toward the center axis of the vehicle.

The collision detector in the seventh embodiment, like the sixth embodiment, can detect and determine the collision from a pressure change in a chamber space 20 of each chamber member 2, and achieves the same effect as the sixth embodiment.

Eighth Embodiment

Figure 10:
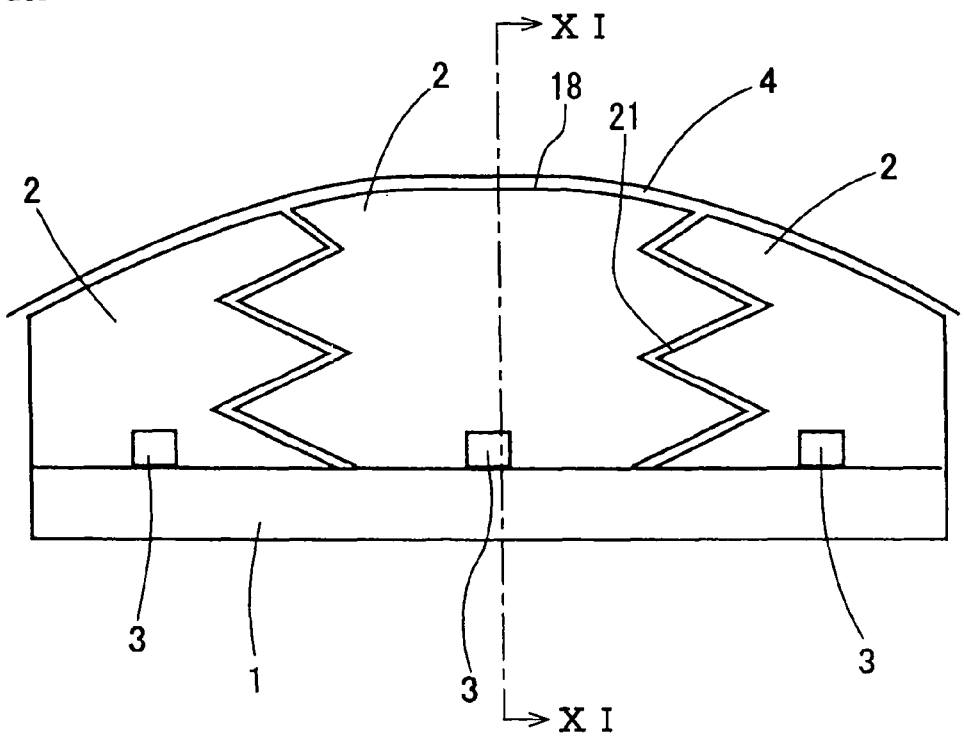
FIG. 10 is top view of an eighth embodiment of the collision detector.

The eighth embodiment includes three chamber members 2 and each side wall face 21 therebetween is inclined. As shown in FIG. 10, the side wall faces 21 between the respective chamber members 2 are inclined in several directions in a wave shape of multiple planes.

Figure 11:
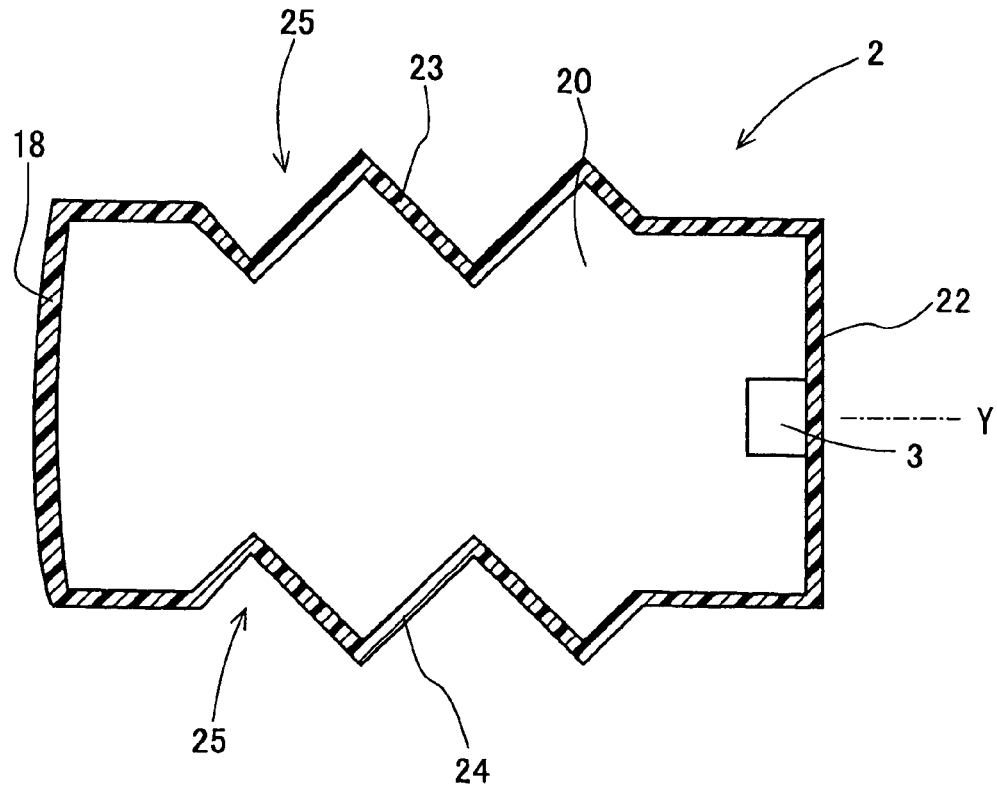
FIG. 11 is a side sectional view of the collision detector of FIG. 10 taken along the line XI-XI.

Furthermore, as shown in the sectional view of FIG. 11, the upper face wall 23 and the lower face wall 24 (i.e., the end face walls of the chamber member 2) include a slanting-wall part 25 that intersects the horizontal plane Y of the vehicle. In the embodiment shown, the slanting-wall part 25 is shaped in a bellows-type, or wave-type shape with multiple inclined planes.

The collision detector in the eighth embodiment is formed in such a manner that a front face wall 18 of the chamber member 2 contacts a bumper cover 4 to provide an outer-peripheral shape which approximately corresponds to an inner-peripheral face of the bumper cover 4.

The slanting-wall part 25 of the chamber member 2, like the wave shape of the side face walls 21, are repeatedly formed in the forward and backward directions of the vehicle.

The collision detector in the eighth embodiment, like the first embodiment, can detect and determine the collision from a pressure change in a chamber space 20 of each chamber member 2, and achieves the same effect as the first embodiment.

In addition, in the collision detector of the eighth embodiment, due to the wave shape of the side face walls 21 and the upper and lower face walls 23, 24, deformation of the chamber members 2 can be controlled. As such detection accuracy can be increased.

Ninth Embodiment

Figure 12:
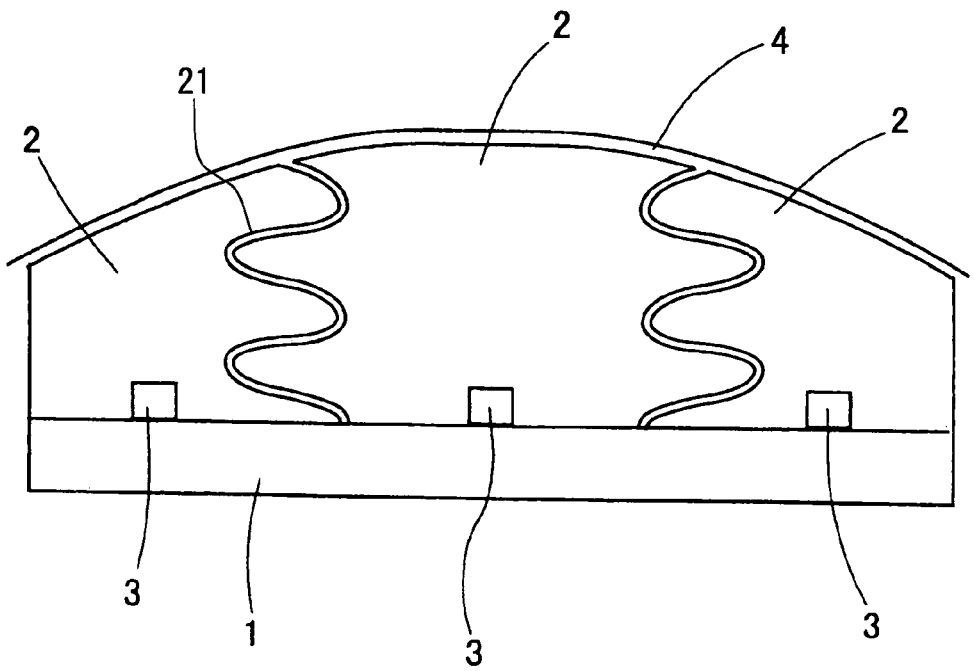
FIG. 12 is a top view of a ninth embodiment of the collision detector.

The ninth embodiment is the same as a collision detector of the eighth embodiment except for a difference in a wave shape inclination of the side face walls 21 between the chamber members 2. FIG. 12 shows a structure of a collision detector of the ninth embodiment.

Each contacting face of neighboring chamber members 2, as shown in FIG. 12, is formed in a wave shape with a smoothly curved surface. The wave shape is also formed to extend out along the forward and backward directions of a vehicle.

A collision detector in the ninth embodiment, like the eighth embodiment, can detect and determine the collision from a pressure change in a chamber space of each chamber member 2, and achieves the same effect as the eighth embodiment.

Tenth Embodiment

The tenth embodiment includes three chamber members 2 and the side face walls 21 abut each other at predetermined locations. As such, the side face wall 21 of one chamber member 2 abuts the neighboring side face wall 21 of the neighboring chamber member 2. The side face walls 21 are adjacent each other such that deformation of one of the chamber members 2 causes deformation of a neighboring chamber member 2.

Figure 13:
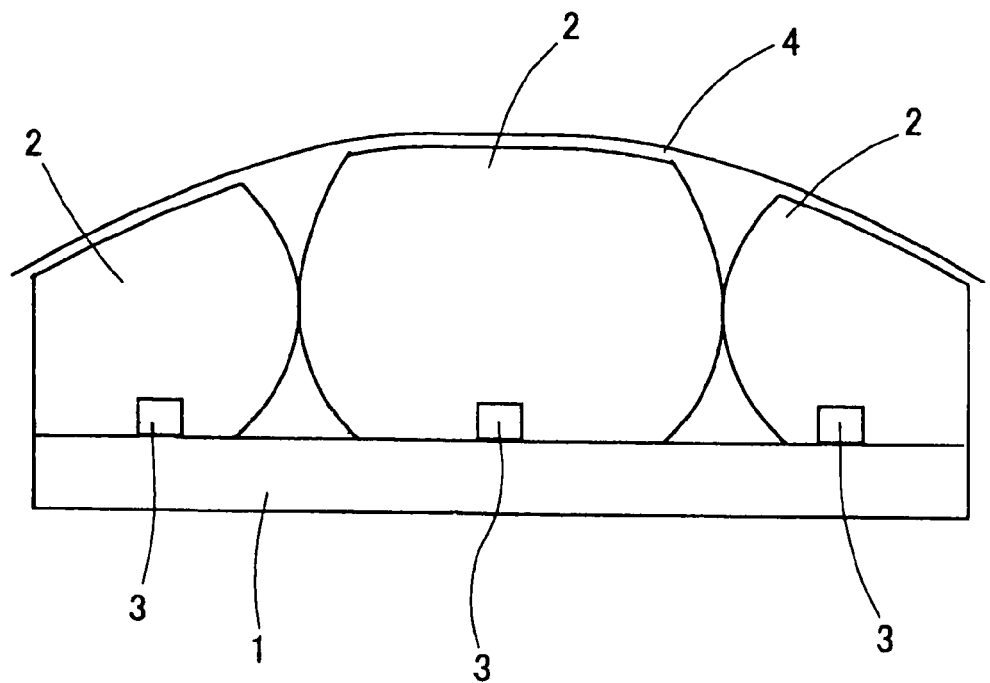
FIG. 13 is a top view of a tenth embodiment of the collision detector.

Furthermore, the front face wall 18 of the chamber members 20 are curved to contact the bumper cover 4 (to provide an outer-peripheral shape which approximately corresponds to an inner-peripheral face of the bumper cover 4). FIG. 13 shows a structure of the collision detector in the tenth embodiment.

The side face walls 21 facing neighboring chamber members 2 are inclined relative to the coupling surface 19. More specifically, the side face walls 21 facing neighboring chamber members 2 are curved outward. The outward most point of the neighboring side face walls 21 abut each other. In the embodiment shown, the outward most point of the side face walls 21 is approximately in the center of the side face wall 21.

The collision detector in the tenth embodiment, like the first embodiment, can detect and determine the collision from a pressure change in a chamber space of each chamber member 2. When the collision occurs near an abutting portion of the chamber members 2, both chamber members 2 are deformed. Thus, the collision detector in the tenth embodiment performs calculation from a measurement result of a pressure change in each chamber space 20 of both the chamber members 2 to detect and determine the collision.

The collision detector in the tenth embodiment, like the first embodiment, can detect and determine the collision from a pressure change in a chamber space 20 of each chamber member 2, and achieves the same effect as the first embodiment.

Eleventh Embodiment

Figure 14:
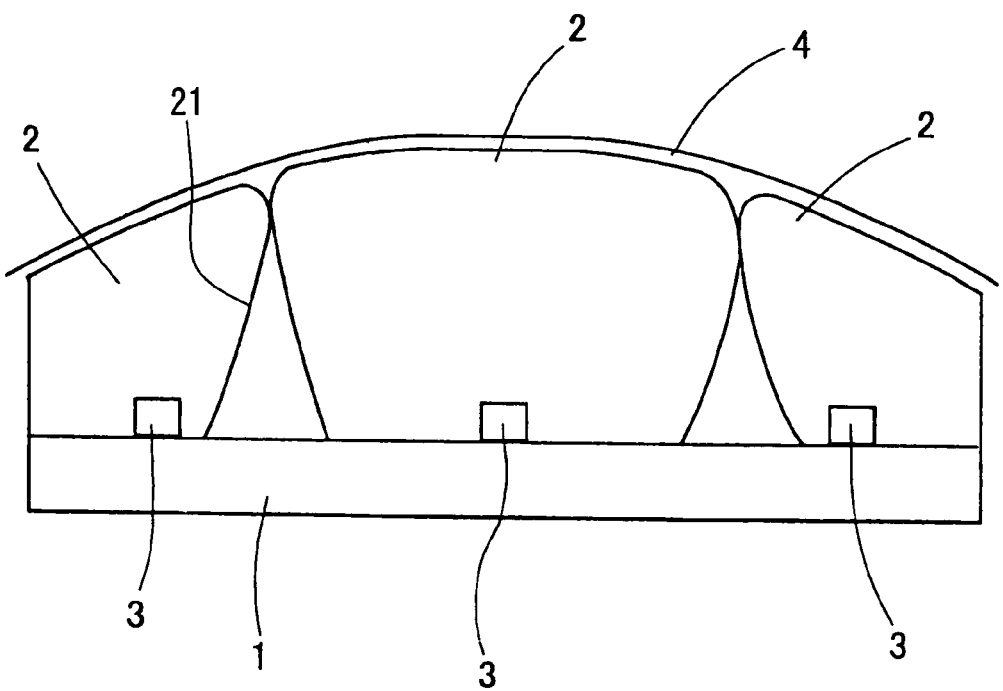
FIG. 14 is a top view of an eleventh embodiment of the collision detector.

An eleventh embodiment is the same as a collision detector in the tenth embodiment except a difference in the area of abutment between the chamber members 2. FIG. 14 shows a structure of a collision detector in the eleventh embodiment. In the embodiment shown, the abutting portion of the side walls 21 is located adjacent the inner surface of the cover 4.

The collision detector in the eleventh embodiment, like the tenth embodiment, can detect and determine the collision from a pressure change in a chamber space of each chamber member 2, and achieves the same effect as the tenth embodiment.

Twelfth Embodiment

Figure 15:
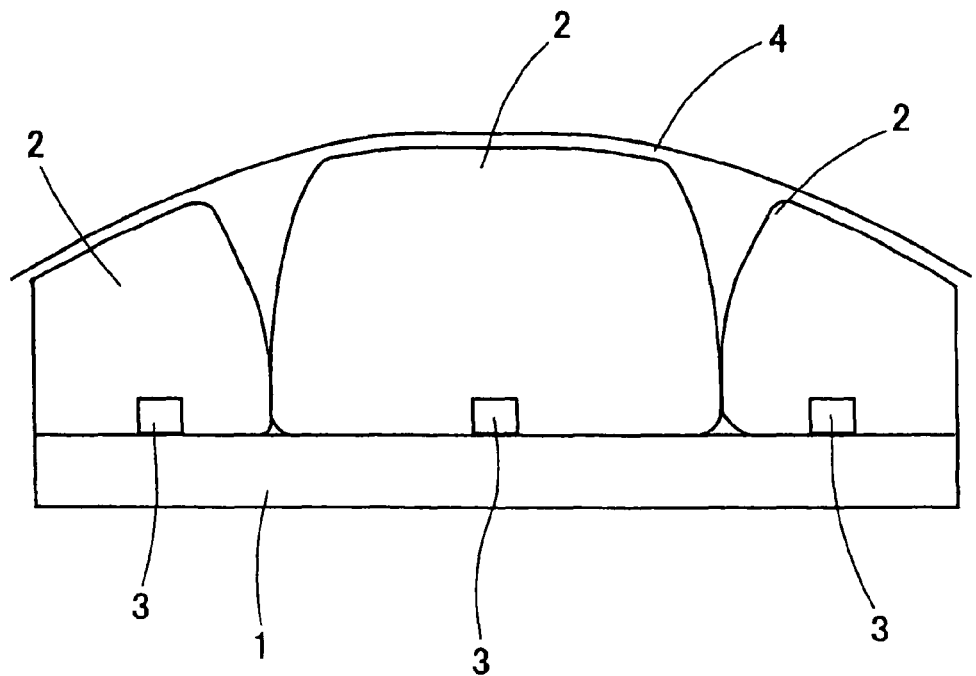
FIG. 15 is a top view of a twelfth embodiment of the collision detector.

A twelfth embodiment is the same as a collision detector in the tenth embodiment except a difference in the area of abutment between the chamber members 2. FIG. 15 shows a structure of a collision detector in the twelfth embodiment. In the embodiment shown, the abutting portion of the side walls 21 is located adjacent the bumper reinforcement 1.

The collision detector in the twelfth embodiment, like the tenth embodiment, can detect and determine the collision from a pressure change in a chamber space of each chamber member 2, and achieves the same effect as the tenth embodiment.

Thirteenth Embodiment

Figure 16:
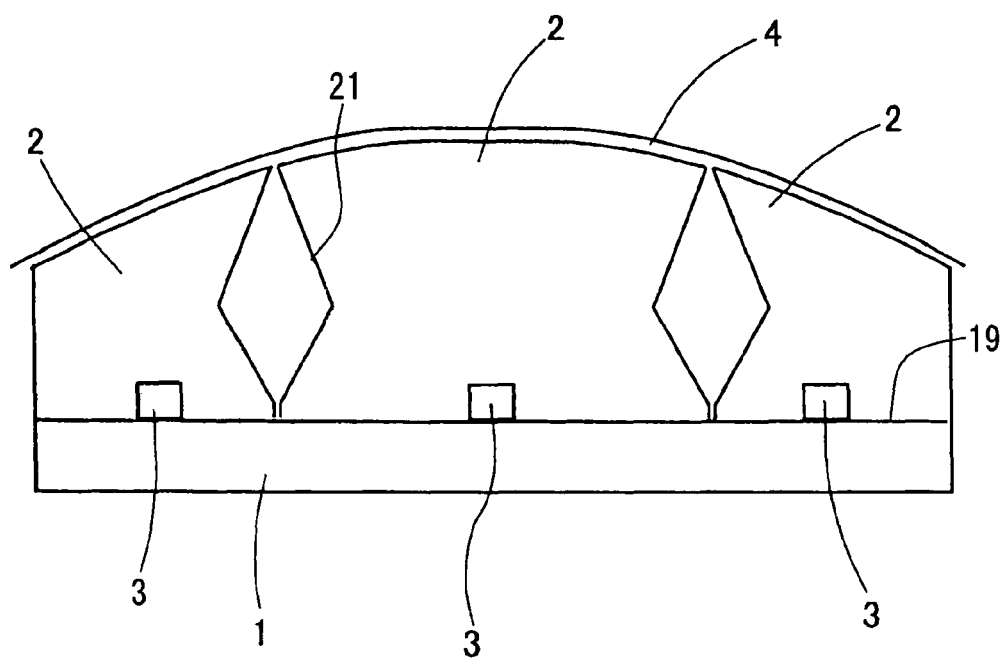
FIG. 16 is a top view of a thirteenth embodiment of the collision detector.

A thirteenth embodiment includes three chamber members 2, and the side face walls 21 are inclined relative to the coupling surface 19 to have a V-shape. Also, the side-face walls 21 are inclined away from neighboring side face walls 21 to thereby define spaces therebetween. In the embodiment of FIG. 16, the spaces are diamond shaped.

The collision detector in the thirteenth embodiment, like the tenth embodiment, can detect and determine the collision from a pressure change in a chamber space of each chamber member 2. When the collision occurs near each contacting part of the chamber members 2, both neighboring chamber members 2 are deformed. Thus, the collision detector in the thirteenth embodiment performs calculation from the measurement result of a pressure change in each chamber space of both chamber members 2 to detect and determine the collision.

The collision detector in the thirteenth embodiment, like the ninth embodiment, can detect and determine the collision from a pressure change in a chamber space of each chamber member 2, and achieves the same effect as the ninth embodiment.

Fourteenth Embodiment

Figure 17:
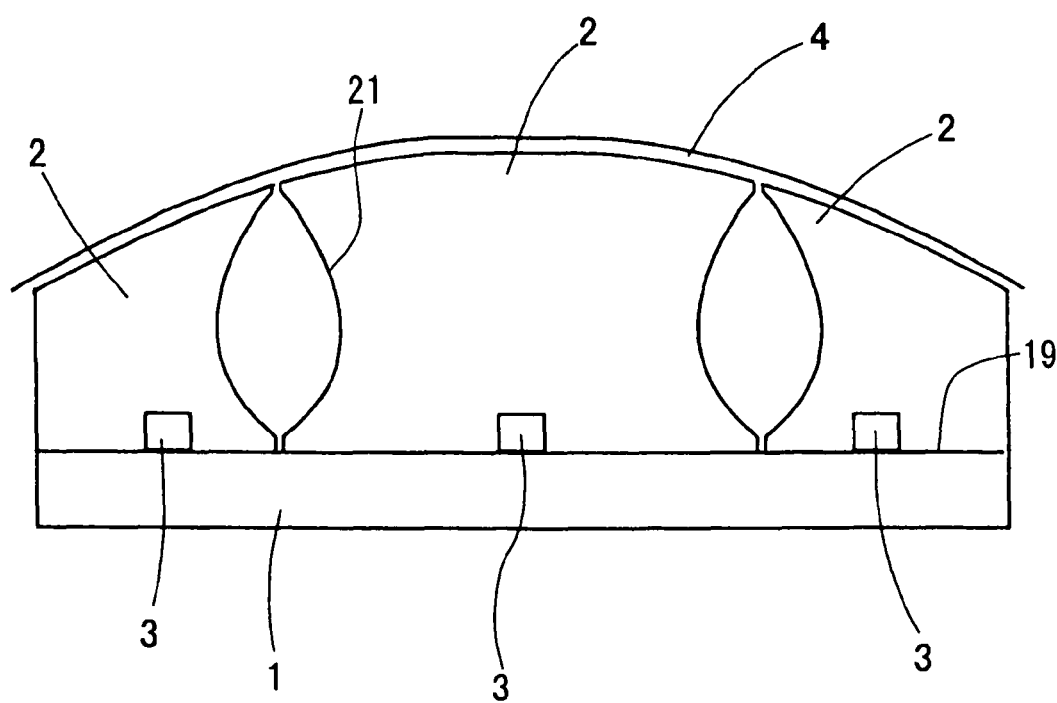
FIG. 17 is a top view of a fourteenth embodiment of the collision detector.

The fourteenth embodiment is the same as a collision detector in the thirteenth embodiment except the side face walls 21 are inclined differently. In the embodiment shown in FIG. 17, the side face walls 21 are curved inwardly so as to define rounded spaces between the chamber members 2.

The collision detector in the fourteenth embodiment, like the thirteenth embodiment, can detect and determine the collision from a pressure change in a chamber space of each chamber member 2, and achieves the same effect as the thirteenth embodiment.

Fifteenth Embodiment

Figure 18:
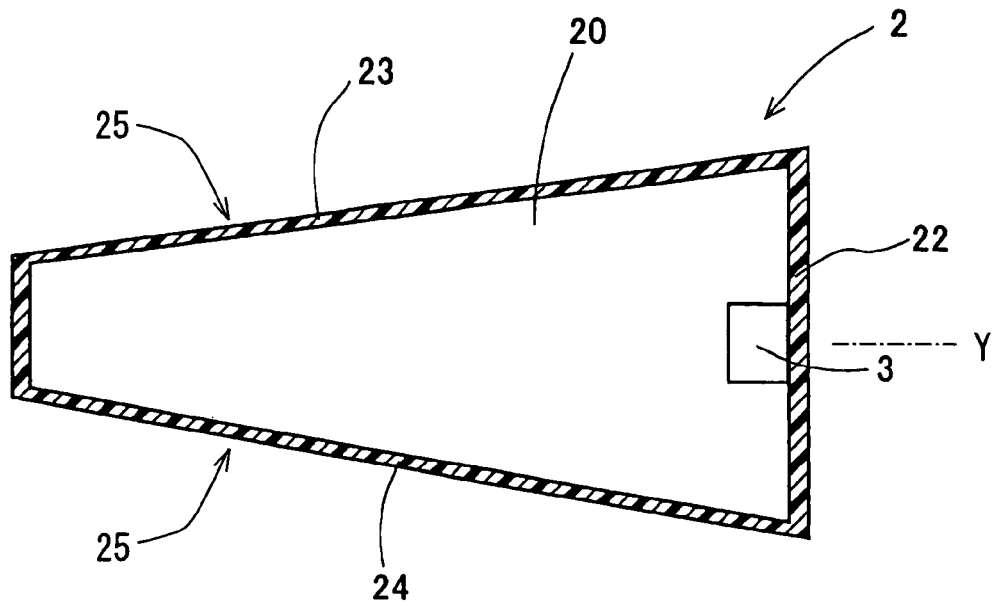
FIG. 18 is a side sectional view of a fifteenth embodiment of the collision detector.

A fifteenth embodiment is the same as a collision detector in the first embodiment except that the upper face wall 23 and the lower face wall 24 of the chamber member 2 is entirely inclined relative to the horizontal plane Y defined by the vehicle. As shown in FIG. 18, the entire upper face wall 23 comprises the slanting-wall part 25 described above with reference to FIG. 11. Furthermore, the entire lower face wall 24 comprises the slanting-wall part 25. More specifically, the upper face wall 23 is planar and is inclined upward from the front of the vehicle toward the back. Also, the lower face wall 24 is planar and is inclined downward from the front of the vehicle toward the back. Thus, the front of the chamber member 20 is narrow at the front of the vehicle, and the height of the chamber member 20 gradually increases toward the back of the vehicle. More specifically, as shown in FIG. 18, the chamber member 2 has a cross sectional shape which is approximately trapezoidal.

The collision detector in the fifteenth embodiment, like the first embodiment, can detect and determine the collision from a pressure change in a chamber space of each chamber member 2, and achieves the same effect as the first embodiment.

In addition, in the collision detector in the fifteenth embodiment, the upper face wall 23 and the lower face wall 24 of the chamber member 2 are formed to be inclined, thereby allowing deformation of the chamber member 20 to be controlled for greater detection accuracy.

Sixteenth Embodiment

Figure 19:
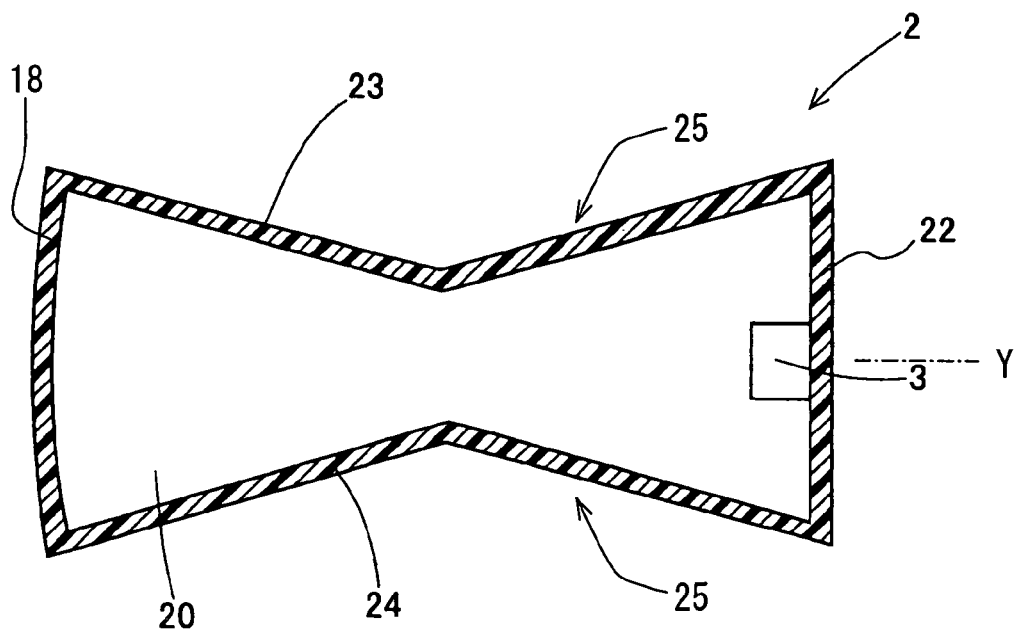
FIG. 19 is a side sectional view of a sixteenth embodiment of the collision detector.

A sixteenth embodiment is the same as a collision detector of the fifteenth embodiment except that an upper face wall 23 and a lower face wall 24 of a chamber member 2 are inclined so as to be recessed into the chamber space 20. FIG. 19 shows a cross section taken in the forward and backward directions of a vehicle, of the chamber member 2 in a collision detector in the sixteenth embodiment.

More specifically, as shown in FIG. 19, the upper face wall 23 includes two planar members so as to be V-shaped, and the upper face wall 23 extends downward slightly toward the center of the chamber space 20. The lower face wall 24 is symmetric to the upper face wall 23 so as to have an inverted V-shape. Thus, the upper and lower face walls 24 are generally convex surfaces relative to the chamber space 20.

The collision detector in the sixteenth embodiment, like the first embodiment, can detect and determine the collision from a pressure change in a chamber space of each chamber member 2, and achieves the same effect as the first embodiment.

In addition, in the collision detector in the sixteenth embodiment, the upper face wall 23 and the lower face wall 24 are formed to be convex relative to the chamber space 20, thereby allowing the deformation behavior to be controlled for greater detection accuracy.

Seventeenth Embodiment

Figure 20:
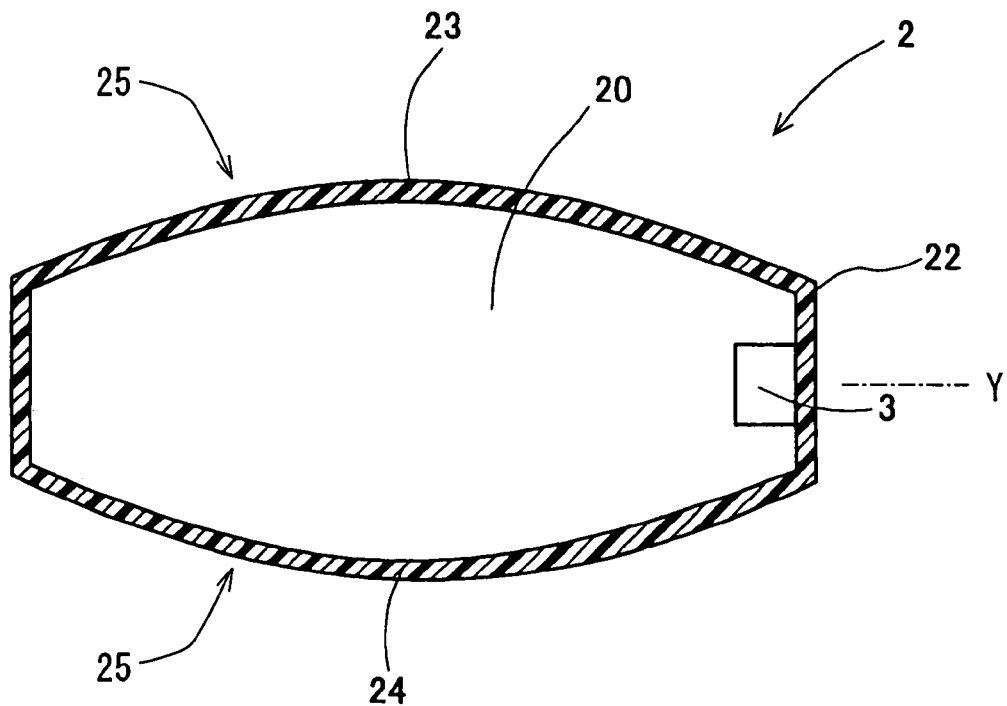
FIG. 20 is a side sectional view of a seventeenth embodiment of the collision detector.
Figure 21:
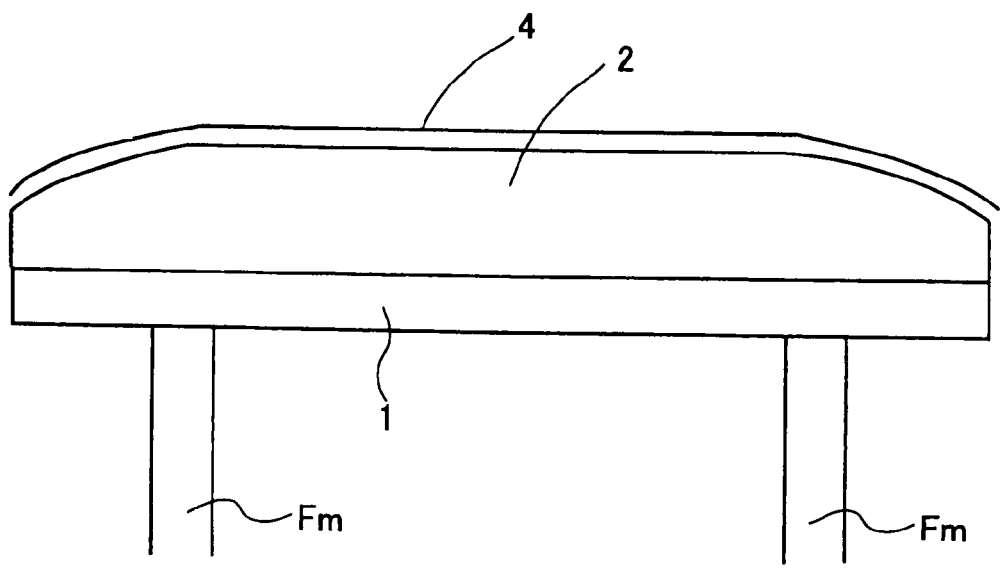
FIG. 21 is a top view of a collision detector of the prior art.
Figure 22:
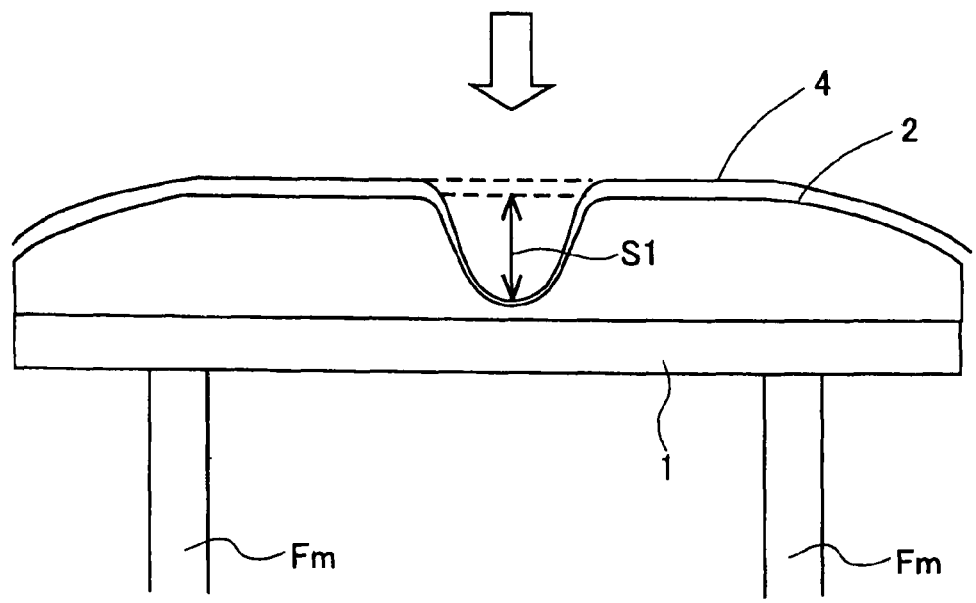
FIG. 22 is a top view of the collision detector of FIG. 21 in a collision.
Figure 23:
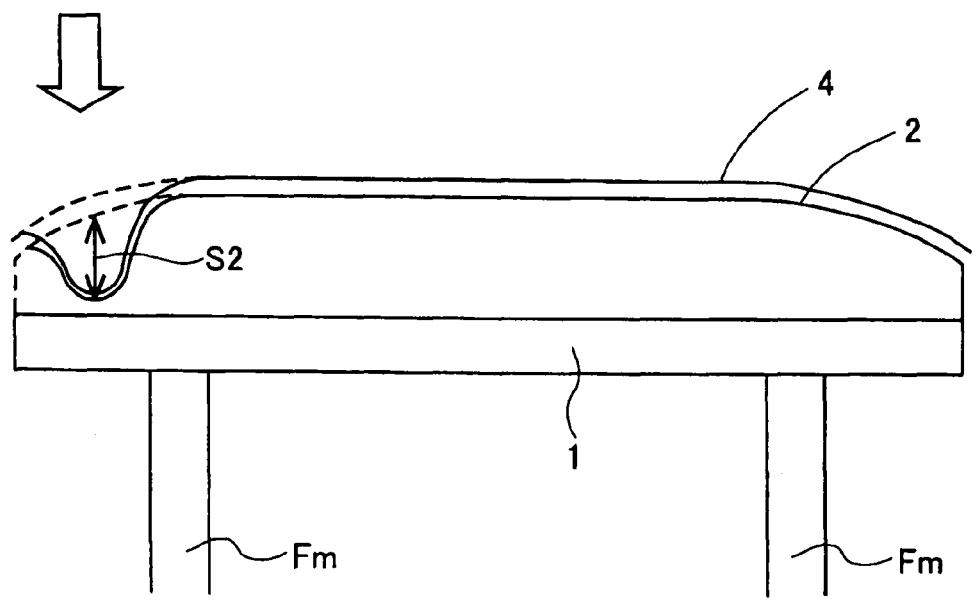
FIG. 23 is a top view of the collision detector of FIG. 21 in a collision.

A seventeenth embodiment is the same as a collision detector of the fifteenth embodiment except that an upper face wall 23 and a lower face wall 24 of a chamber member 2 are curved outward from the center of the chamber space 20 so as to be concave relative to the chamber space 20. FIG. 20 shows a cross section taken in the forward and backward directions of a vehicle, of the chamber member 2 in a collision detector of the seventeenth embodiment.

The collision detector in the seventeenth embodiment, like the first embodiment, can detect and determine the collision from a pressure change in the chamber space of each chamber member 2, and achieves the same effect as the first embodiment.

In addition, in the collision detector in the seventeenth embodiment, the upper face wall 23 and the lower face wall 24 of the chamber member 2 are formed to be a concavity relative to the chamber space 20. As such, deformation of the chamber member 20 can be controlled for increased detection accuracy.

Additional Embodiments

Each of the above-mentioned embodiments shows a structure in which the chamber member 2 forming the chamber space 20 also serves as an energy-absorber. However, the present invention is not limited to this structure. For example, it is possible to achieve the same effect in a structure where the absorber is formed of a metal plate and the chamber member 2 is disposed in an absorber space thereof. In the above structure, it is also possible to adjust the crushing properties of a whole bumper by adjusting the crushing properties of the chamber member 2.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A collision detector for a vehicle that defines a width direction, the collision detector comprising:
   a back plate for coupling to the vehicle;
   a plurality of chamber members coupled to the back plate, wherein each of the chamber members defines a chamber space therein; and
   a plurality of pressure sensors that detect pressure of the chamber spaces, respectively, to detect collision of the vehicle;
   wherein the chamber members are provided across the width of the vehicle, and a deformation property of at least one of the plurality of chamber members is different from that of the rest of the plurality of chamber members; and
   wherein the vehicle defines a horizontal plane, and at least one of the chamber members includes an end face wall with a slanting-wall part that intersects the horizontal plane, the slanting-wall part is at least one of a convexity and a concavity relative to the chamber space.

2. A collision detector for a vehicle that defines a width direction, the collision detector comprising:
   a back plate for coupling to the vehicle;
   a plurality of chamber members coupled to the back plate, wherein each of the chamber members defines a chamber space therein; and
   a pressure sensor for detecting pressure in at least one of the chamber spaces to thereby detect collision of the vehicle;
   wherein the chamber members are provided across the width of the vehicle; and wherein the vehicle defines a horizontal plane, and at least one of the chamber members includes an end face wall with a slanting-wall part that intersects the horizontal plane, the slanting-wall part is at least one of a convexity and a concavity relative to the chamber space.

3. A collision detector according to claim 2, wherein the chamber members abut each other.

4. A collision detector according to claim 2, wherein the chamber members are provided adjacent each other such that deformation of one of the chamber members causes deformation of another one of the chamber members.

5. A collision detector according to claim 2, wherein at least one of the chamber members includes a plurality of face walls, and wherein at least one of the face walls facing a neighboring chamber member is more flexible than another of the face walls.

6. A collision detector according to claim 2, wherein the chamber members are coupled to a coupling surface of the back plate, wherein at least one of the chamber members includes a side face wall facing a neighboring chamber member that is at least partially inclined relative to the coupling surface.

7. A collision detector according to claim 2, wherein at least one of the chamber members includes a front surface that is opposite to and spaced from the back plate, wherein the front surface is non-planar.

8. The collision detector according to claim 7, wherein the at least one chamber members is provided at an outboard side of the vehicle.

9. The collision detector according to claim 7, further comprising a cover that covers the chamber members on an outer portion of the vehicle, and wherein the front surface is non-planar according to the shape of the cover.

10. A collision detector according to claim 2, wherein the end face wall entirely comprises the slanting-wall part.

11. A collision detector according to claim 2 wherein the slanting-wall part is at least partially planar.

12. A collision detector according to claim 2, wherein the chamber spaces are each air tight.

13. A collision detector for a vehicle that defines a width direction, the collision detector comprising:
   a back plate for coupling to the vehicle;
   a plurality of chamber members coupled to the back plate, wherein each of the chamber members defines a chamber space therein; and
   a pressure sensor for detecting pressure in at least one of the chamber spaces to thereby detect collision of the vehicle;
   wherein the chamber members are provided across the width of the vehicle; and wherein the vehicle defines a horizontal plane, and at least one of the chamber members includes an end face wall with a slanting-wall part that intersects the horizontal plane, the slanting-wall part is formed in a wave shape.

14. A collision detector for a vehicle that defines a width direction, the collision detector comprising:
   a back plate for coupling to the vehicle;
   a plurality of chamber members coupled to the back plate, wherein each of the chamber members defines a chamber space therein; and
   a plurality of pressure sensors that detect pressure of the chamber spaces, respectively, to detect collision of the vehicle;
   wherein the chamber members are provided across the width of the vehicle, and a deformation property of at least one of the plurality of chamber members is different from that of the rest of the plurality of chamber members; and wherein the vehicle defines a horizontal plane, and at least one of the chamber members includes an end face wall with a slanting-wall part that intersects the horizontal plane, the slanting-wall part is formed in a wave shape.

* * * * *